March 10, 1931. N. W. STORER 1,795,904
CONTROL SYSTEM
Filed Oct. 20, 1927
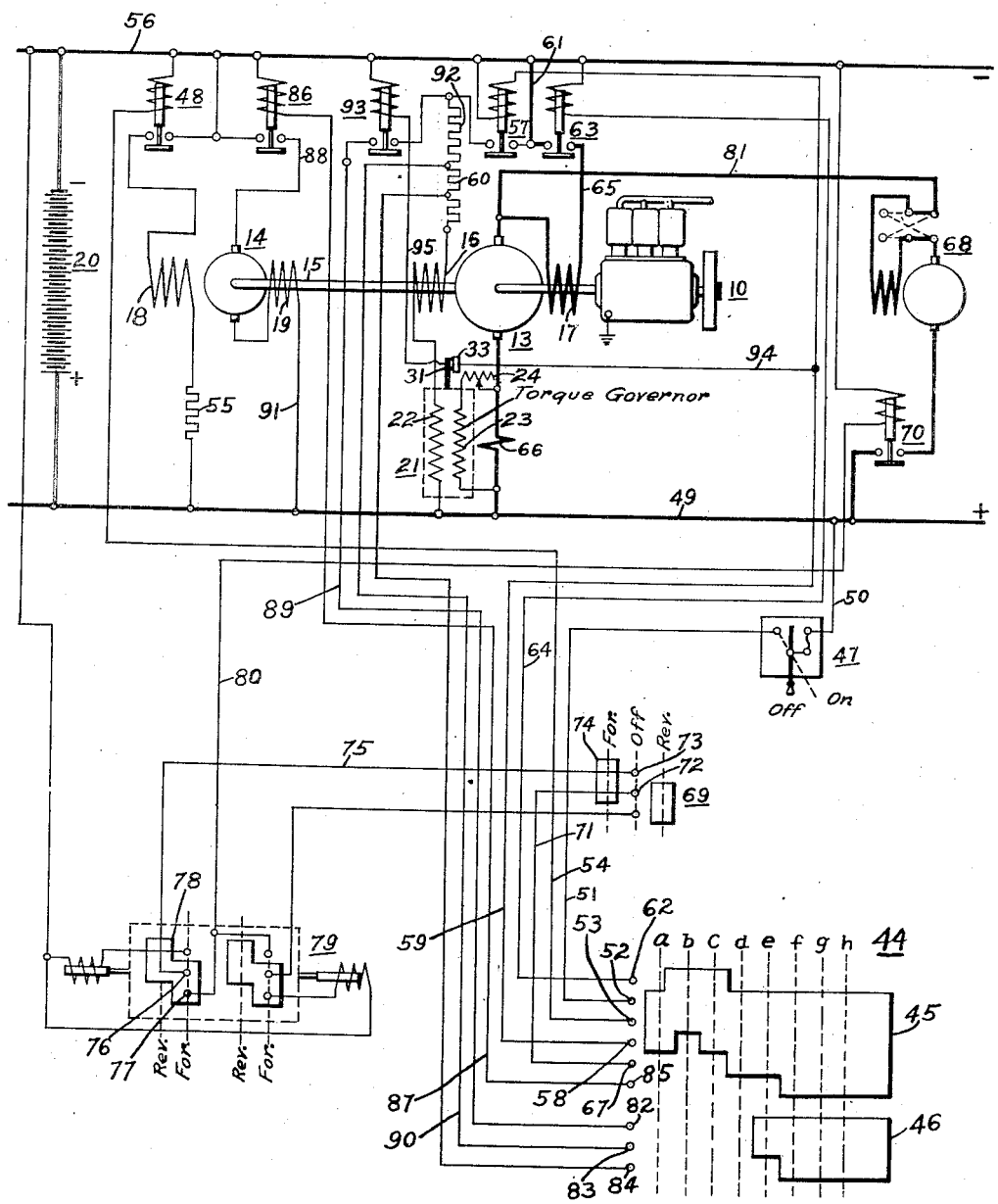
INVENTOR
Norman W. Storer
BY
Chesley S. Carr
ATTORNEY Patented Mar. 10, 1931

1,795,904

UNITED STATES PATENT OFFICE

NORMAN W. STORER, OF PITTSBURGH, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed October 20, 1927. Serial No. 227,459.

The invention relates generally to control systems for power units and more particularly to control systems for power units, the prime movers of which are internal-combustion engines.

The object of the invention, generally stated, is the provision of a control system for power units that shall be simple and efficient in operation and readily and economically installed.

A more specific object of the invention is to provide for controlling the excitation of the generator of a power unit, including an internal-combustion engine and a generator, to limit the torque, that may be required of the engine.

A further object of the invention is to provide for automatically varying the excitation of a generator field winding in response to changes in the current flowing in the generator armature winding.

Other objects of the invention will, in part, be obvious and will, in part, appear hereinafter.

The invention, accordingly, is disclosed in the embodiment thereof shown in the accompanying drawing and comprises the structural features, combination of elements and arrangement of parts that will be exemplified in the construction hereinafter set forth and the scope of the application of which will be indicated in the claims.

For a fuller understanding of the nature and objects of the invention, reference may be had to the following detailed description, taken in conjunction with the accompanying drawing, in which;

The single figure is a diagram of a control system connected in accordance with this invention.

Referring now to the drawing, 10 designates, generally, an internal-combustion engine of a type suitable as the prime mover of a power unit for vehicles. In this particular embodiment of the invention, a Diesel engine is illustrated but it will be readily understood that the control system may be applied to generators driven by any other suitable means.

As shown, a main generator 13 and an auxiliary generator or exciter 14 are directly connected to the engine by means of a shaft 15. In this instance, the generator 13 is provided with a shunt field winding 16 and a starting winding 17. The exciter 14 is also provided with a shunt field winding 18 and a differential field winding 19.

In order to provide for the supply of electric current when the power unit is not in operation, and to maintain the voltage of the auxiliary system substantially constant, a storage battery 20, of any well-known type, is provided. As will be set forth hereinafter, the storage battery is also used for supplying the current required for actuating the electromagnetic switches of the control system.

It is well known that internal-combustion engines, particularly Diesel engines, operate most efficiently at predetermined torques, which depend on the type and structural features of the engines. Accordingly, when internal-combustion engines are utilized as the prime movers of power units provided for propelling vehicles which are required to travel over roads having varying grades, in order to obtain the best results, it is desirable to provide for the development of the rated torque over a wide range of engine speeds which will depend on the amount of power required and to limit the torque that may be imposed on the engines.

In this particular system, in order to limit the torque that may be imposed on the engine, a governor, shown generally at 21, is provided for controlling the excitation of the generator, and, therefore, the generator output. A governor of any suitable type, such, for example, as the torque governor shown and described in my copending application 227,460, filed October 20, 1927 may be utilized.

The connections between the generator and the governor will depend upon the size and characteristics of the machines and the operating conditions to be met.

In the embodiment of the invention illustrated, the torque governor comprises a field winding 22 and a rotor winding 23, the former being connected in series with the shunt field winding 16 and the latter being connected in shunt to the interpole field windings 66 of the generator 13. As shown, a variable resistor 24 is connected in series with the winding 23 in order to vary the current and obtain the desired ratio between the current flowing in that winding and in the armature of the generator 13.

In the operation of the governor, the rotor of the torque governor is set in a predetermined position, and the contact member 31, carried thereby, stands in engagement with a contact screw 33. The field winding 22 and the rotor winding 23 are so wound that the electromagnetic forces developed tend to rotate the rotor and move the contact member 31 out of engagement with the contact screw 33. Then, upon the flow of a predetermined current in the governor windings, the circuit through the contact members 31 and 33 may be interrupted.

The control system diagrammatically illustrated in the figure and in which the torque governor is provided for limiting the load on the engine, will now be described.

It will be noted that a manually operable controller drum 44, provided with contact segments 45 and 46, is utilized for controlling the circuits of the system.

In starting the engine, the generator 13 is operated as a motor and energized from the storage battery 20. In order to connect the generator across the battery, a switch 47 is closed, and the controller drum 44 is advanced one step.

When the controller drum reaches position "a", a switch 48 is closed by an actuating circuit which extends from the positive side of the battery 20, through conductors 49 and 50, switch 47, conductor 51, contact fingers 52 and 53 bridged by the contact segments 45, conductor 54 and the actuating coil of switch 48, back to the battery. Upon the closure of the switch 48, an energizing circuit for the shunt field winding of the exciter 14 is established which extends from the battery 20, through conductor 49, resistor 55, shunt field winding 18, switch 48, and conductor 56, back to the battery. This energizing circuit for the shunt field winding 18 remains closed as the controller drum is actuated from position to position.

The switch 57 is also closed when the controller drum is moved to position "a" by an actuating circuit which extends from the energized contact segment 45 of the controller drum through contact finger 58, conductor 59, actuating coil of switch 57 and back to the battery through conductor 56. The closure of switch 57 establishes an energizing circuit of the shunt field winding 16 of the generator 13 which may be traced from the energized conductor 49, through the governor winding 22, shunt field winding 16, resistors 60 and 92, switch 57, and conductors 61 and 56, back to the battery.

As will be observed, during the movement of the controller drum from position "a" to position "b", contact finger 62 is engaged by the contact segment 45 before the contact finger 58 is disengaged from the contact segment 45. In this manner, the switch 63 is closed, by an actuating circuit extending from the energized contact segment 45, through contact finger 62, conductor 64, the actuating coils of switch 63, and conductor 56, back to the battery, before the switch 57 is dropped out. Therefore, the shunt field winding 16 of the generator 13 is connected to function in cumulative relation with the starting field winding 17 when the generator is utilized, as a motor, to turn over the engine 10. Consequently, the generator will develop a large torque, and the engine will be started without an excessive flow of current.

The circuit established for operating the generator as a motor to start the engine may be traced from the positive terminal of the battery 20, through conductor 49, interpole field winding 66, the armature of the generator 13, the starting field 17, conductor 65, switch 63, conductors 61 and 56, back to the battery. Further, as soon as the engine starts, the generator is driven and it will deliver current to the battery.

When the controller is advanced to position "c", the contact finger 58 is engaged by the contact segment 45, and the actuating circuit of the switch 57 is established and the switch closed. It will be noted that the switch 57 is not closed again until after the engine has been started and the dynamo 13 is functioning as a generator. Further, it will be readily understood that, when the generator is delivering current, the current flowing in the starting field winding 17 is reversed to oppose the magnetizing effect of the shunt field winding 16.

The controller drum is now set in what may be termed the "idling position", and the engine is running with a light load. As will be observed, when the engine is idling, the switches 57 and 63 are closed and the battery 20 connected across the generator. Therefore, when the engine is idling, the battery is being charged, the charging circuit extending from the generator 13 through the starting field 17, conductor 65, switch 63, conductors 61 and 56, battery 20 and conductor 49, the interpole winding 66 and the torque governor winding 23 connected in parallel, and back to the generator. Therefore, the battery is charged through the starting field 17 which governs the flow of current.

Prior to the actuation of the controller drum to position "d", which connects the propelling motor 68 across the generator, the reverser switch 69 is actuated to either its forward or its reverse position. In order to simplify the description of the circuits, it will be assumed that the reverser switch 69 is thrown to its forward position.

It will be noted that, as the controller is moved from position "c" to position "d", the energized contact segment 45 is disengaged from the contact finger 62, and the actuating circuit of the switch 63 is interrupted.

When the controller is now moved to its position "d", and the energized contact segment 45 engages the contact finger 67, the line switch 70 is closed by a circuit which may be traced from the contact segment 45, through contact finger 67, conductor 71, contact fingers 72 and 73, bridged by the contact segment 74 of the reverser switch 69, conductor 75, contact fingers 76 and 77, bridged by the contact segment 78 of the reverser drum 79, conductor 80, the actuating coil of switch 70 and the conductor 56, back to the battery. The motor 68 is now connected across the generator 13, and current flows from the generator through the rotor winding 23 of the torque governor and the interpole field 66 of the generator connected in parallel, conductor 49, switch 70, motor 68 and conductor 81, back to the generator.

When the controller drum is moved into positions "e" and "f", the contact segment 46 bridges the contact fingers 82 and 83 first, and then contact fingers 83 and 84, short-circuiting, successively, sections of the resistor 60. In this manner, the resistance in the field circuit is decreased step-by-step, permitting an increase in the exciting current of the generator 13.

It will be observed that, when the controller drum reaches position "f", the contact finger 85 is engaged by the energized contact segment 45, and an actuating circuit for the switch 86 is established which may be traced from the contact segment 45, through contact finger 85, conductor 87, the actuating coil of the switch 86, and conductor 56, back to the battery. The auxiliary generator or exciter 14 is now connected across the shunt field of the generator.

In this instance, the exciting circuit for the generator 13 extends from the generator 14, through conductor 88, switch 86, conductor 56, conductor 61, switch 57, conductor 89, contact fingers 82 and 83, bridged by contact segment 46, conductor 90, a portion of the resistor 60, shunt field 16, the field winding 22 of the torque governor and conductors 49 and 91, back to the exciter 14. Further, the exciter 14 is connected across the battery 20 and may be utilized for charging the latter.

As will be readily understood from the foregoing description, the windings 22 and 23 of the torque governor are connected to carry the currents flowing in the generator field and armature windings. In this particular construction, the winding 23 is connected in parallel with the inter-pole winding 66. Consequently, the winding 23 will carry only a predetermined portion of the armature current. However, it will be readily understood that the winding 23 may be made suitable for carrying the whole armature current. The resistor 24 may be operated to control the current flowing in the rotor windings 23 to give the desired ratio between the generator armature current and the governor rotor current.

As hereinbefore explained, when there is no current flowing in the governor, the contact member 31 is retained in engagement with the contact screw 33. Thus, when the power unit is being started, the section 92 of the resistor 60 is short-circuited by the switch 93. The actuating circuit for the switch 93 extends from the battery 20, through conductors 49 and 50, switch 47, conductor 51, contact fingers 52 and 58, bridged by the contact segment 45, conductors 59 and 94, the contact screw 33, and contact member 31, conductor 95, the actuating coil of the switch 93 and conductor 56, back to the battery. As will be observed, when the switch 93 is closed, the section 92 of the resistor 60 is short-circuited.

Assuming now that the current flowing in the armature is greatly increased because of some operating condition, the torque developed in the governor will be increased and the governor rotor, carrying winding 23, will be operated to interrupt the actuating circuit of the switch 93. In this manner, the switch is dropped out, and the section 92 of the resistor 60 is introduced into the field circuit of the generator. The current flowing in the field is decreased and the load on the generator is decreased, tending to maintain a constant torque on the engine 10.

Assuming that the vehicle is accelerated, and the counter-electromotive force in the motor 68 is increased, thereby reducing the current flowing in the generator armature, and the load on the generator and the engine 10 is thus decreased. With a decrease of armature current, the torque in the torque governor is decreased and the rotor of the governor is actuated to project the contact member 31 into engagement with the contact screw 33, thereby re-establishing the actuating circuit of the switch 93. When the switch 93 is closed, the section 92 of the resistor 60 is again short-circuited, and the exciting current of the generator 13 is increased, increasing the load on the generator and tending to maintain a constant torque on the engine.

In operation, the governor functions quite rapidly to change the exciting current of the generator to maintain the torque on the engine substantially constant. It will be readily understood that a torque governor of this type may be designed to meet any operating conditions. Further, a governor that is installed in any particular power unit may be adjusted in the shop to function continuously with the particular power unit, and adjustment in the field will be unnecessary.

Since numerous changes may be made in the above-described construction, and different embodiments of the invention may be made without departing from the spirit and scope thereof, it is intended that all matter contained in the above description or shown in the accompanying drawing shall be interpreted as illustrative and not in a limiting sense.

I claim as my invention:

1. In a power system, in combination, an internal-combustion engine, a separately excited generator driven by the engine, said generator having field and armature windings and means responsive to the current flowing in the field and armature windings disposed to control the excitation of the generator to maintain a substantially constant torque on the engine.

2. In a power system, in combination, a prime mover, a separately excited generator driven by the prime mover, said generator having field and armature windings, means for exciting the field windings, means for controlling the excitation of the field windings, and means responsive to the currents flowing in the field and armature windings for actuating the control means to maintain the torque on the prime mover substantially constant.

3. In a power system, in combination, a prime mover, a separately excited generator driven by the prime mover, said generator having field and armature windings, a torque governor having a plurality of relatively movable windings, said governor windings being connected in series with the generator windings, and means actuated by the governor for varying the current flowing in the field winding of the generator to maintain a substantially constant torque on the engine.

4. In a power system, in combination, an internal-combustion engine, a separately excited generator driven by the engine, said generator being provided with field and armature windings, a governor provided with field and armature windings, said governor windings being disposed to carry the currents flowing in the corresponding generator windings and means actuated by the governor for controlling the current flowing in the generator field windings to maintain the torque imposed on the engine substantially constant.

5. In a power system, in combination, an internal-combustion engine, a separately excited generator driven by the engine, said generator being provided with field and armature windings, a governor provided with field and armature windings, said governor windings being disposed to carry the currents flowing in the corresponding generator windings, means for varying the current flowing in the governor armature winding and means actuated by the governor for controlling the current flowing in the generator field winding to maintain the generator torque substantially constant.

6. In a power system, in combination, a variable speed internal-combustion engine, a separately excited generator driven by the internal-combustion engine, said generator having armature and field windings, a torque governor having armature and field windings and torque characteristics which are similar to the torque characteristics of the generator, the armature and field windings of the torque governor being connected in series-circuit relation with the armature and field windings of the generator, respectively, so that the governor will respond to the currents flowing in the generator windings, and means responsive to the operation of the governor for controlling the current flowing in the generator field winding to maintain the torque of the generator imposed on the internal-combustion engine substantially constant independently of speed.

7. In a power system, in combination, a variable speed internal-combustion engine, a separately excited generator driven by the internal-combustion engine, said generator having armature and field windings, a torque governor having armature and field windings disposed to receive current from the generator armature and field windings, respectively, and means responsive to the operation of the governor to control the current in the generator field winding and the torque imposed on the internal-combustion engine.

8. In a power system, in combination, an internal-combustion engine, a separately excited generator driven by the internal-combustion engine, said generator having armature and field windings, a torque governor having armature and field windings disposed to receive current from the generator armature and field windings, respectively, means for controlling the proportion of the generator currents that flow through the armature and field windings of the governor and means responsive to the operation of the governor to control the currents flowing in the windings of the generator to govern the torque imposed on the internal-combustion engine.

9. In a power system, in combination, an internal-combustion engine, a separately excited generator driven by the internal-combustion engine, said generator having armature and field windings, a torque governor having armature and field windings and characteristics which match the characteristics of the generator, the armature and field windings of the torque governor being connected in series-circuit relation with the armature and field windings of the generator, respectively, means for controlling the proportion of the generator currents that flow through the governor windings and means responsive to the operation of the governor to control the current in the generator windings to limit the torque imposed on the internal-combustion engine.

10. In a power system, in combination, an internal-combustion engine, a separately excited generator driven by the internal-combustion engine, said generator having armature and field windings, a torque governor having armature and field windings connected in series-circuit relation with the generator armature and field windings, respectively, means for controlling the proportion of the generator current flowing in the governor windings and means disposed to be actuated in response to the operation of the governor to control the current in the generator field winding to limit the torque imposed on the internal-combustion engine for different predetermined speeds.

11. In a power system, in combination, a variable speed internal-combustion engine, a separately excited generator driven by the internal-combustion engine, said generator having armature and field windings, a torque governor having armature and field windings connected in series-circuit relation with the armature and field windings of the generator, respectively, whereby the torque governor is subjected to forces dependent upon the torque imposed upon the engine and means responsive to the operation of the torque governor to limit the torque imposed on the internal-combustion engine.

In testimony whereof, I have hereunto subscribed my name this 8th day of October, 1927.

NORMAN W. STORER.